April 18, 1961 E. W. STRONG ET AL 2,980,186
ROTOR CONTROL SYSTEM FOR HELICOPTER
Filed Jan. 10, 1956 5 Sheets-Sheet 3

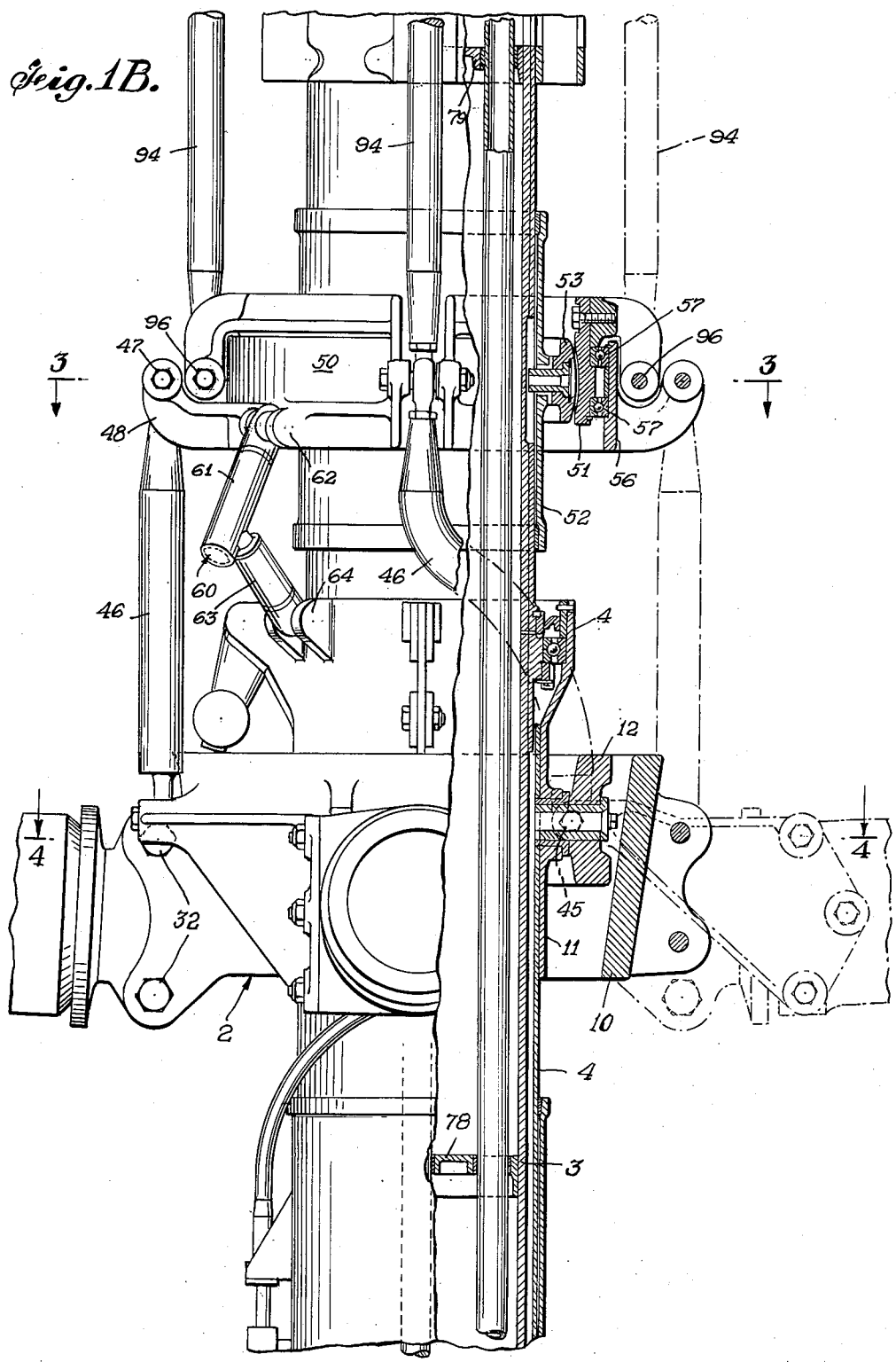

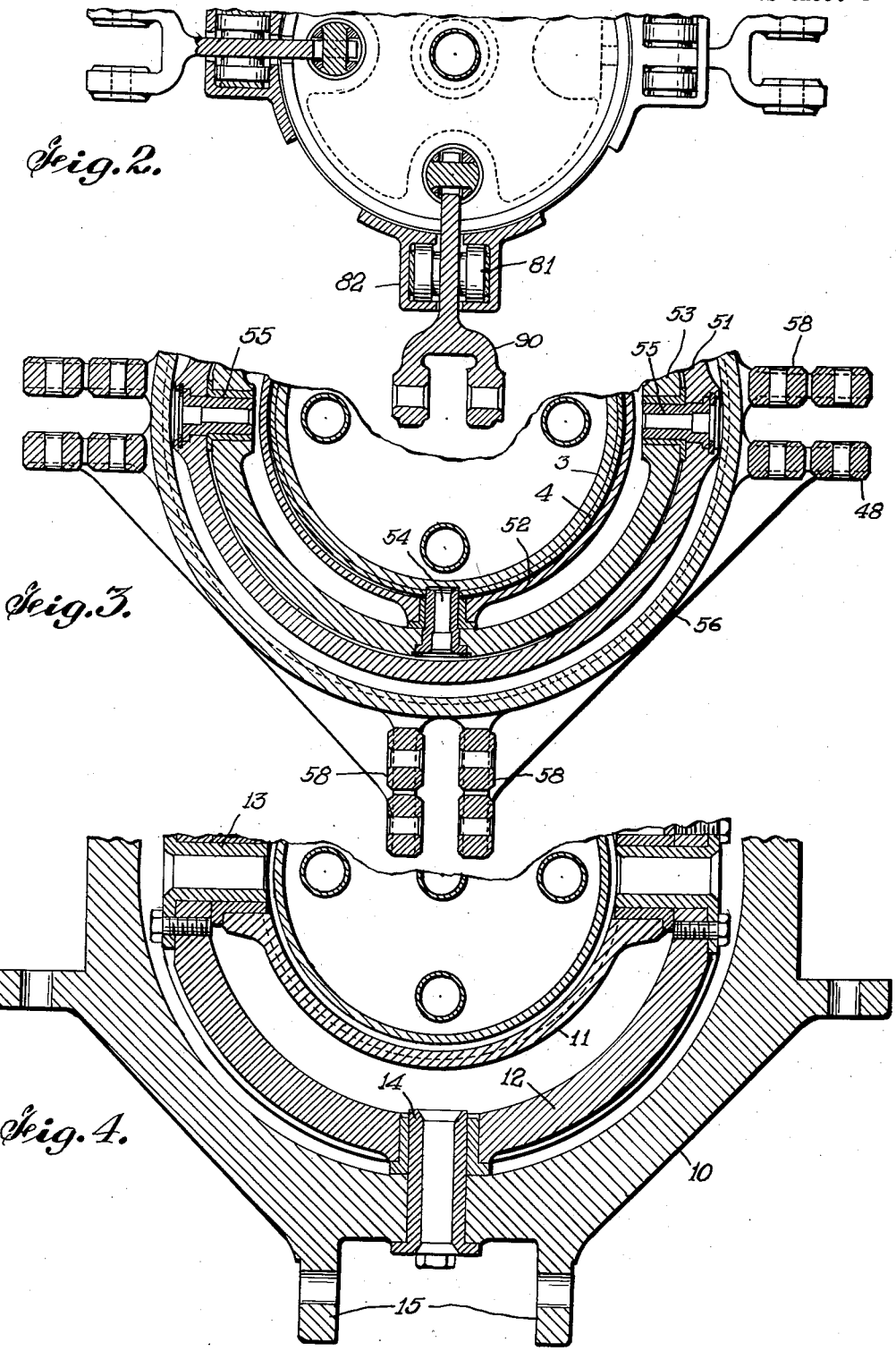

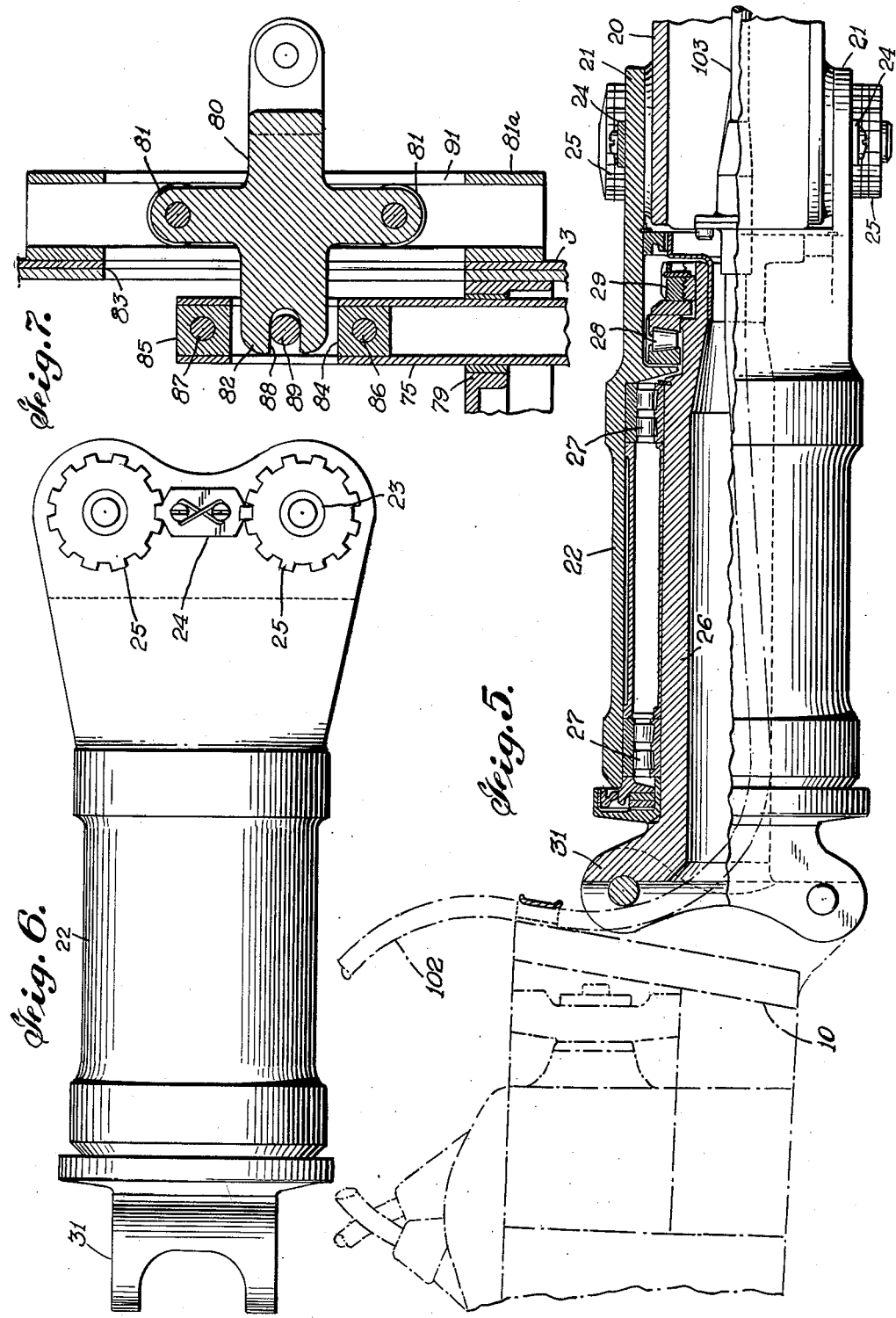

United States Patent Office 2,980,186
Patented Apr. 18, 1961

2,980,186

ROTOR CONTROL SYSTEM FOR HELICOPTER

Edward W. Strong, Stony Brook, Alexander James Pappas, Bellerose, Arthur Marquis Losey, Islip, and Geoffrey Griffiths Clewlow, Oyster Bay, N.Y., assignors to Gyrodyne Company of America, Inc., St. James, N.Y., a corporation of New York Filed Jan. 10, 1956, Ser. No. 558,226

7 Claims. (Cl. 170—135.26)

The present invention relates to rotor systems for rotary wing aircraft herein referred to as helicopters and to rotor control systems. The invention is particularly applicable to multi-bladed rotors i.e. rotors having at least 3 blades. It is especially advantageous as applied to coaxial rotor systems using four-bladed rotors. In accordance with present practice, the blades of a helicopter rotor are mounted in such a way as to be rotatable about their longitudinal axes in order to vary the pitch of the blades. Suitable control systems are provided for varying the blade pitch both cyclically and non-cyclically. In some configurations the rotor blades also have limited freedom of movement in a vertical direction. For example it is known to have the blades articulated relative to the rotor hub so as to permit vertical flapping. Two bladed rotors of the semi-rigid or seesaw type are also known.

Although helicopters are one of the earliest types of aircraft known, their development has been hampered by serious difficulties that have been encountered particularly in the rotor system and in rotor control. One problem that has been particularly serious is that of eliminating or at least minimizing vibration and other recurring cyclical forces. In addition to the usual vibration problems arising from the high speed rotation of large diameter rotors, there are complications arising from aerodynamic forces some of which occur cyclically in synchronism with the rotation of the rotor and some occur irregularly. For example in forward flight the air speed of the advancing rotor blades is higher than that of the retreating blades. The drag forces on the advancing blades are hence greater. There are also variations in lift tending to produce the recurring forces disturbing the equilibrium and smooth operation of the rotor system.

A further problem encountered in rotor systems having coaxial counter-rotating rotors is that of preventing blade closure. If the rotors tilt in opposite directions, the distance between the rotors at one point in the circle of rotation is reduced and in an extreme case the rotors would strike one another. Blade closure resulting from pitch control is particularly troublesome. The pitch of the rotor blades is customarily controlled by means of of universally tiltable swash plates and connections between the swash plates and a pitch horn projecting from each rotor blade near the hub. If the pitch of each rotor blade were controlled by a connection to the swash plate in the same vertical plane as the longitudinal axis of the blade, there would be an angle of 90° between the high point of the swash plate and the high point of the rotor disc. For example if the swash plate were tipped up at the front, the upper rotor, which customarily rotates counter-clockwise, would be high at the left hand side and low at the right while the lower rotor would be low at the left and high at the right thus tending to cause blade closure on the right hand side. To avoid the danger of blade closure, it is desirable to connect the pitch horns to the swash plate with a 90° lead. For this purpose, the pitch horns may be curved, projecting forwardly in a circumferential direction so that the forward end of the pitch horn is 90° ahead of the longitudinal axis of the rotor blade.

It is an object of the present invention to provide an improved multi-blade rotor system in which vibration and other equilibrium disturbing forces are reduced and in which blade closure is effectively avoided. In accordance with the invention, this is accomplished by providing a multi-blade rotor system having a predetermined delta-3 angle in combination with 90° phasing. The delta hinge or flapping hinge of a rotor blade is the hinge or line about which up and down flapping occurs. If the point of connection between the pitch horn of a rotor blade and linkage connecting the pitch horn with the swash plate is located outwardly of flapping hinge line i.e. nearer the tip of the blade, upward movement of the blade tends to decrease the pitch and conversely downward movement of the blade tends to increase the pitch, thus providing compensating and stabilizing forces. This arrangement is referred to as providing a delta-3 angle. In a semi-rigid rotor system the flapping hinge line is a line perpendicular to the longitudinal axis of the blade and to the axis of the rotor shaft. Hence if the pitch horn curves around and is connected to the swash plate with a 90° lead to avoid blade closure resulting from pitch control, the connection is on the flapping hinge line and no delta-3 angle is obtained. However, in accordance with the invention, it is made possible to achieve 90° phasing while at the same time having a predetermined delta-3 angle.

With four-bladed rotors, a further problem arises from the fact that since the rotor blades are 90° apart, it is difficult to obtain 90° phasing since each blade is in the way of the pitch horn of the next succeeding blade. This difficulty is also solved by the novel arrangement in accordance with the invention.

In a helicopter having a coaxial rotor system, it is difficult to provide the required control connections between the fuselage and the upper rotor. The difficulty is complicated by the fact that the intervening lower rotor turns in the opposite direction. The connections must provide positive action and must be able to withstand high stresses. In accordance with the present invention, there is provided an improved rotor control system having advantages of ruggedness, durability and simplicity of design. The control system in accordance with the invention has a further advantage that it is easily enclosed so as to be protected from the elements and yet is readily accessible.

The nature, objects and advantages of the invention will be more fully understood from the following description and claims in conjunction with the accompanying drawings in which a preferred embodiment is shown by way of example.

In the drawings:

Figs. 1A, 1B and 1C are together an elevation partly in vertical section showing a rotor head in accordance with the invention including a transmission and control mechanism.

Fig. 2 is a partial cross section taken approximately on the line 2—2 in Fig. 1A.

Fig. 3 is a partial cross section taken approximately on the line 3—3 in Fig. 1B.

Fig. 4 is a partial cross section taken approximately on the line 4—4 in Fig. 1B.

Fig. 5 is an elevation partly in vertical section showing a portion of the upper rotor head and the mounting of one of the rotor blades.

Fig. 6 is a plan of the shank portion of one of the rotor blades.

Fig. 7 is an enlargement of the lower right hand portion of Fig. 1A showing a portion of the pitch control mechanism.

Figure 1A:
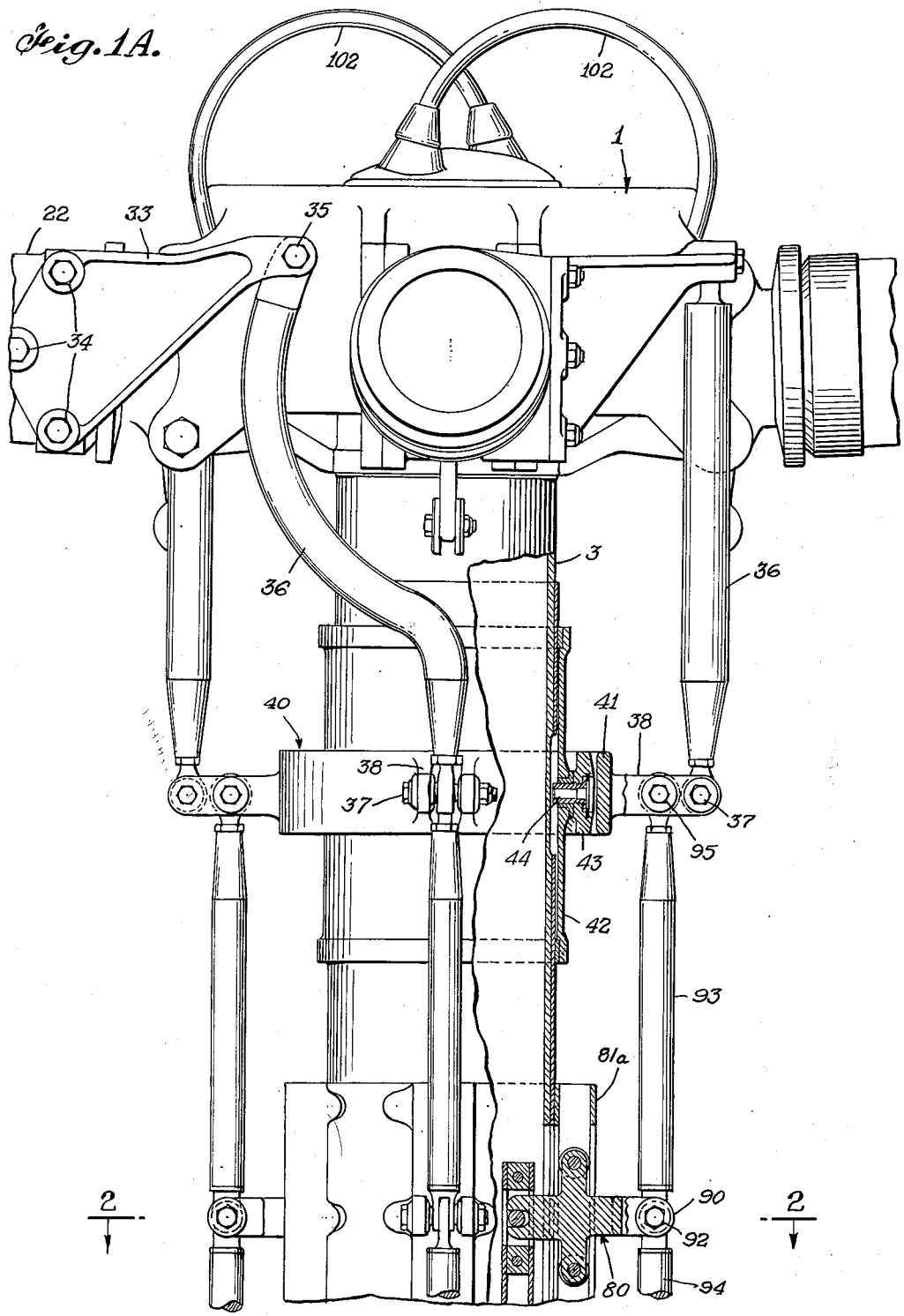

In the several figures, certain parts are omitted in order to simplify and clarify the drawings.

The rotor system illustrated in the drawings, comprises an upper rotor 1 and lower rotor 2 mounted respectively on coaxial tubular rotor shafts 3 and 4 extending upwardly from a transmission 5. The rotor shafts are rotatably supported by suitable bearings 6 and are driven in opposite directions by a bevel gear 7 fixed on the upper rotor shaft and a bevel gear 8 fixed on the lower rotor shaft both meshing with a driving pinion 9 connected to a suitable power source. The bearings of the rotor shafts are designed to take both radial and thrust loads and have sufficient load carrying capacity to support the weight of the fuselage which is suspended from the housing of the transmission 5. The fuselage may be of conventional or any suitable design and is hence not shown in the drawings.

Each of the rotors comprises an annular hub 10 (Figs. 1B and 4) which is mounted on the respective rotor shaft so as to rotate therewith and be universally tiltable. The mounting of the rotor hub—herein referred to as a "gimbal" mounting—is shown as comprising a sleeve 11 fixed on the rotor shaft, an intermediate ring 12 tiltably mounted on the sleeve 11 by diametrically opposite pivot pins 13 and connected to the rotor hub 10 by diametrically opposite pivot pins 14 spaced 90° from the pins 13 (Fig. 4). The hub 10 is provided with integral apertured brackets 15 for mounting the rotor blades on the hub. Each rotor is illustrated as having four equally spaced blades.

The rotor blades 20 (Fig. 5) are of airfoil cross section and are mounted on the rotor hub 10 so as to be rotatable about longitudinal axes which extend radially from, and are fixed relative to, the rotor hub. Hence the entire rotor comprising the hub and blades is tiltable as a unit about virtual axes perpendicular to the axis of the rotor shafts. For example, if the lifting force acting on one blade is greater than the lifting force acting on the opposite blade in the four bladed configuration shown, the rotor as a whole will tilt about a virtual axis perpendicular to the rotor shaft axis and to the longitudinal axis of the first mentioned blade. The axis about which the blade is rotatable preferably coincides with its neutral axis which in practice is located on the quarter chord line of the blade. As illustrated in Figs. 5 and 6, the root portion of the rotor blade 20 is received between spaced flanges 21 provided at the outer end of a tubular grip 22 and is secured by eccentric pins 23 which are rotatable to adjust the sweep of the blade and are locked in adjusted position by a locking plate 24 engaging toothed discs 25 fixed on the pins. The grip 22 is rotatably mounted on a spindle 26 by radial bearings 27 and a thrust bearing 28, being retained on the spindle by a nut 29. The spindle 26 has a base portion 31 which fits the bracket 15 on the rotor hub 10 and has holes which are aligned with the holes in the brackets. Bolts 32 (Fig. 1B) extend through the aligned holes in the bracket and in the base portion 31 of the spindle to secure the spindle rigidly on the rotor hub 10. The axes of the spindles 26 are preferably inclined slightly—for example at an angle of 5°—to a plane perpendicular to the axis of the rotor shaft to provide a pre-cone angle. The rotor blades thus are mounted rigid relative to the hub except for being rotatable about their longitudinal axes by rotation of the grips 22 on the spindles 26 to change the pitch of the blades. The pitch of each blade is controlled individually by means of a horn 33 which is fixed to the grip 22 by bolts 34 (Fig. 1A) and projects forwardly from the blade. The horn 33 extends circumferentially ahead of the rotor blade a distance materially less than 90° and hence does not interfere with the next preceding blade of a four-bladed rotor. The forward projection of the blade horn is preferably of the order of 60° to 80°. As the flapping hinge line of the blade is a line perpendicular to the longitudinal axis of the blade and to the axis of the rotor shaft, the blade has a delta-3 angle of 10° to 30°.

The pitch control horn 33 of each blade of the upper rotor is connected by a pivot pin 35 to one end of a link 36, the opposite end of which is connected by a pivot pin 37 to a pair of radially projecting lugs 38 of an upper swash plate 40. The swash plate 40 comprises a ring 41 which encircles the upper rotor shaft and from which the lugs 38 project. The ring 41 is gimbally mounted on the upper rotor shaft so as to rotate therewith and be universally tiltable. The mounting comprises a sleeve 42 which rotates with and is axially slidable on the upper rotor shaft and an intermediate ring 43 tiltably mounted on the sleeve 42 by diametrically opposite pivot pins 44. The ring 41 is connected to the ring 43 by diametrically opposite pivot pins (not shown) which are disposed 90° from the pivot pins 44.

The point at which each of the links 36 is connected to the swash plate 40 is 90° ahead of the respective rotor blade and is hence in a vertical plane defined by the rotor shaft axis and a virtual axis of tilt of the hub perpendicular to the rotor shaft axis and to the longitudinal axis of the rotor blade. In the four blade configuration shown in the drawing, the point of connection of the link 36 of a blade lies in a vertical plane defined by the longitudinal axis of the next preceding rotor blade and the axis of the rotor shaft. The link 36 is thus laterally offset as clearly shown in Fig. 1A so as to be somewhat S-shaped. Thus the lower end of the link is 90° ahead of the respective rotor blade while the point at which the upper end of the link is connected to the horn 33 is less than 90° ahead of the longitudinal axis of blade, for example 60° to 80°. By connecting the blades to the swash plate in this manner, it is possible to obtain a 90° lead angle and still obtain a delta-3 angle of for example 10° to 30°. Moreover, the arrangement avoids interference between the pitch horns and the preceding blades. The lateral offset in the link 36 connecting the horn with the swash plate provides ample clearance for movement of the link despite the fact that the lower end of the link is connected to the swash plate in the vertical plane of the preceding blade.

The pitch control horn of each blade of the lower rotor is similarly connected by a pivot pin 45 to one end of a link 46, the other end of which is connected by a pivot pin 47 to a pair of radially projecting lugs 48 on a lower swash plate 50. The swash plate comprises a ring 51 (Figs. 1B and 3) which is gimbally mounted on the upper rotor shaft so as to rotate therewith and be universally tiltable. The mounting comprises a sleeve 52 rotating with and axially slidable on the upper rotor shaft and an intermediate ring 53 which is tiltably mounted on the sleeve 52 by diametrically opposite pins 54 and is connected to the ring 51 by diametrically opposite pins 55 disposed 90° from the pins 54. A further ring 56 is rotatably supported on the ring 51 by antifriction bearings 57 so as to tilt with the ring 51 but freely rotatable relative thereto. The outer ring 56 carries the lugs 48 to which the pitch control links 46 of the lower rotor are connected. The ring 51 is similarly provided with four equally spaced pairs of lugs 58 for connections between the swash plate and the control system described below.

Suitable means is provided for causing the outer ring 56 of the lower rotor swash plate to rotate with the lower rotor while still permitting it to tilt universally within selected limits. As illustrated in Fig. 1B, the driving means 60 for the ring 56 comprises an arm 61 which is pivotally mounted on lugs 62 on the ring 56 so as to be capable of swinging up and down about an axis tangential to the ring. At its outer end the arm 61 is pivotally connected to an arm 63 which is pivotally mounted on spaced lugs 64 on an enlarged upper portion of the lower rotor shaft so as to swing about an axis tangential to the shaft. The rotational movement of the lower rotor shaft 4 is thereby transmitted to the ring 56 while the ring 51 of the lower swash plate rotates with the upper rotor shaft by reason of its gimbal mounting on that shaft. The rings 51 and 56 thus rotate in opposite directions but tilt together.

The pitch control system for the rotor blades comprises a master swash plate 65 (Fig. 1C) disposed below the transmission for driving the rotor shafts and connections extending up inside the rotor shafts to connect the master swash plate with the upper swash plate 40 and lower swash plate 50. The master swash plate comprises a rotating ring 66 which is gimbally mounted on a sleeve 67 by means of an intermediate ring 68 and pivotal connections between the rings as described above. The sleeve 67 is rotatable with but axially slidable on a stub shaft 69 which projects downwardly from the lower end of the upper rotor shaft 3. An outer ring 70 is mounted on the ring 66 by bearings 71 so that the rings 66 and 70 are rotatable relative to one another but tilt together. The outer ring 70 is non-rotating and is provided with diametrically opposite lugs 72 and a third lug (not shown) spaced 90° from the lugs 72 for connecting the ring 70 to suitable pilot or automatic controls. By means of these controls, the lower swash plate 65 can be moved bodily in a vertical direction for collective pitch control and can also be tilted in any direction for cyclical pitch control. Manual controls are preferably connected to the master swash plate through suitable power operated servo mechanism. As such mechanism is known, further description is unnecessary.

Figure 1C:
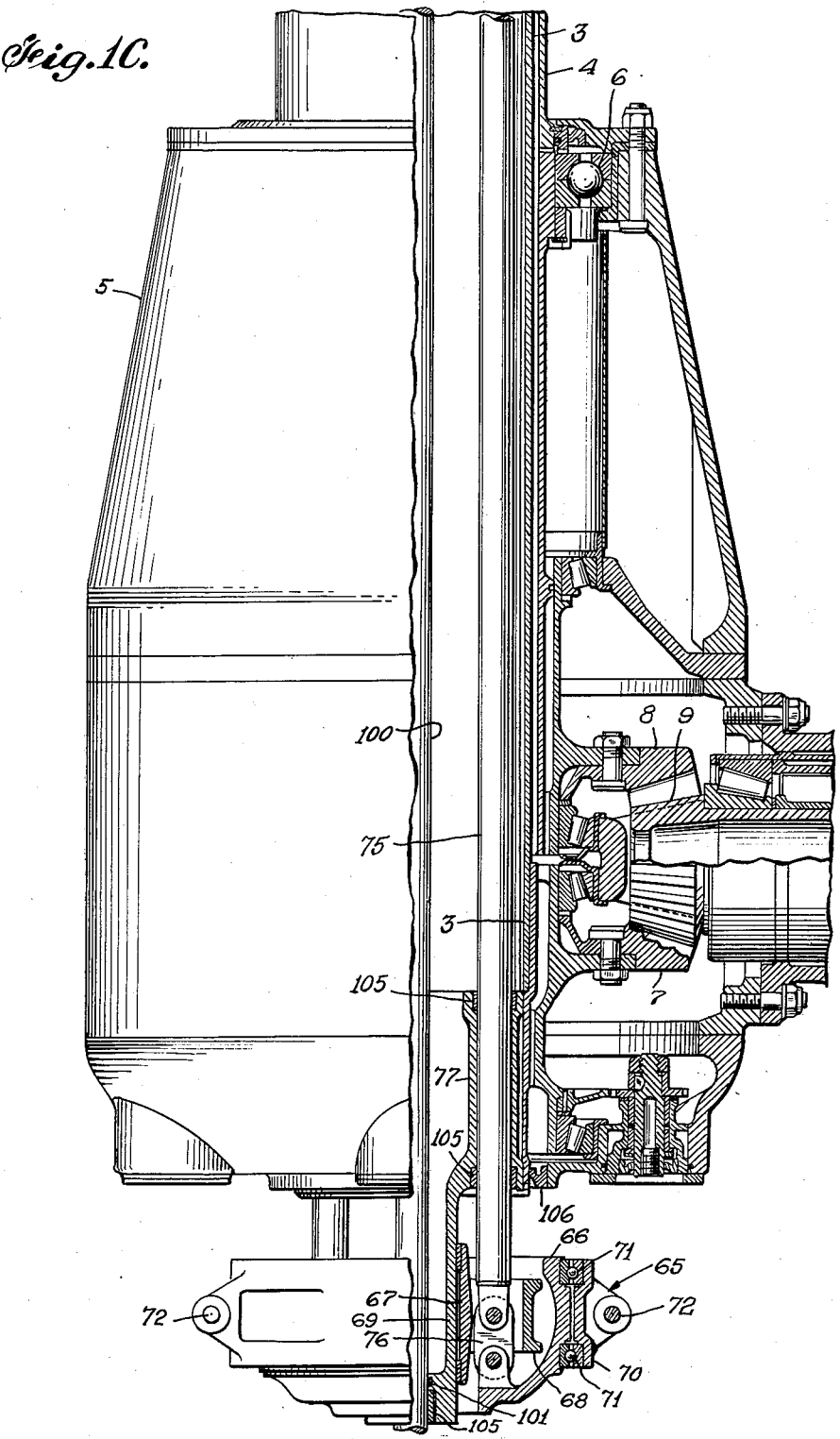

The ring 66 of the master swash plate 65 rotates with the upper rotor shaft and is mechanically connected with the upper and lower swash plates so that all three swash plates move in unison. The connecting means is shown as comprising 4 tubular rods 75 which extend up inside the upper rotor shaft and at their lower ends are connected to circumferentially spaced points on the ring 66 by short pivoted links 76. The rods 75 are guided for longitudinal movement by bearings 77 near their lower ends intermediate bearings 78 (Fig. 1B) and bearings 79 near their upper ends. At its upper end, each of the rods 75 is connected to a cross head 80 which is cross shaped (Figs. 1A and 7) and is guided for up and down movement by rollers 81 running in a track 81a fixed to the outside of the upper rotor shaft 3, for example by rivets, bolts or welding. The cross head 80 has an arm 82 that projects through a slot 83 in the rotor shaft 3 and into a slot 84 in a block 85 fixed on the upper end of the tubular rod 75 for example by pins 86. The tracks 81a reinforce the shaft adjacent the slots. A recess 88 in the inner end of the arm 82 engages a cross pin 89 in the block 85 so that the cross head 80 is moved up and down by movement of the rod 75. A bifurcated outer arm 90 of each of the cross heads 80 projects out through a vertical slot 91 in the track 81a and is pivotally connected by a bolt 92 to the lower end of an upwardly extending link 93 and the upper end of a downwardly extending link 94. The upper end of each of the links 93 is pivotally connected by a bolt 95 with one of the pairs of lugs 38 on the ring 41 of the upper swash plate 40. The lower end of each of the links 94 is pivotally connected by a bolt 96 to one of the pairs of lugs 58 on the ring 51 of the lower swash plate 50 (Figs. 1B and 3). The vertical and tilting movement of the master swash plate 65 is thus transmitted through the bars 75, cross heads 80 and links 93 and 94 to the upper swash plate 40 and the lower swash plate 50. While four rods 75 together with associated cross heads and links have been shown, three such rods are sufficient to transmit both vertical and tilting movement of the swash plates. While the connections between the master swash plate and the upper and lower swash plates are largely enclosed within the rotor shafts, the connections can readily be installed and serviced.

The connections between the swash plates do not interfere with the installation of other control connections inside the rotor shafts. For example in the drawings there is shown a control shaft 100 (Fig. 1C) extending up through a central bearing 101 in the stub shaft 69 and further guided by bearing plates 78 and 79. At its upper end, the control shaft 100 is connected by Bowden wires 102 with push-pull rods 103 (Fig. 5) which extend out through the rotor blades and actuate control surfaces such as tip brakes or other control devices. Suitable oil seals 105 and 106 (Fig. 1C) prevent the loss of lubricant from the transmission and rotor head assembly.

The invention thus provides an improved rotor assembly and control system representing an important advance in the art. While a preferred embodiment of the invention has been shown and described in detail, it will be understood that the invention is not restricted to this embodiment.

What is claimed is:

1. In a rotor system for rotary wing aircraft, coaxial upper and lower rotors, coaxial upper and lower rotor shafts, means for driving said shafts in opposite directions, the upper rotor shaft extending upwardly beyond the lower rotor shaft, each of said rotors comprising a rotor hub mounted on the respective rotor shaft to rotate therewith and tilt universally relative thereto and at least three rotor blades extending radially outwardly from said hub, said blades being mounted on the respective rotor hub for rotation about axes which extend longitudinally of the blades and are fixed relative to said hub so that the rotor comprising said hub and blades is tiltable as a unit about virtual axes perpendicular to the axis of the rotor shafts, and means for turning said blades about said longitudinally extending axes to control the pitch of said blades, said pitch control means comprising a pitch horn extending forwardly from each blade adjacent the hub, a swash plate for each of said rotors, each swash plate being coaxial with the rotor shafts and universally tiltable and comprising a ring rotatable with the shaft of the respective rotor, and a pitch control link for each blade, each of said links being connected at one end to the pitch horn of the respective blade and at the opposite end to a point on the swash plate approximately ninety degrees in advance of the respective rotor blade and lying approximately in a plane defined by the rotor shaft axis and a virtual axis of tilt of said hub perpendicular to the rotor shaft axis and to the longitudinal axis of said blade so that said point of connection for a blade of the lower rotor and a corresponding point of connection for a blade of the upper rotor when directly above said lower rotor blade are approximately 180 degrees apart, whereby the paths of rotation of the upper rotor blades and the lower rotor blades are maintained approximately parallel, the point of connection between said horn and link being disposed not more than eighty degrees ahead of the respective rotor blade to provide a stabilizing effect on the rotors.

2. In a rotor system for rotary wing aircraft, coaxial upper and lower rotors, coaxial upper and lower rotor shafts, means for driving said shafts in opposite directions, the upper rotor shaft extending upwardly beyond the lower rotor shaft, a rotor hub mounted on each of said shafts to rotate therewith and tilt universally relatively thereto, four rotor blades extending radially outwardly from each of said hubs, each of said blades being rotatably mounted on said hub to turn about an axis that extends longitudinally of the blade and is fixed angularly relative to said hub so that the rotor comprising the hub and four blades is tiltable as a unit about virtual axes perpendicular to the axis of the rotor shafts, a pitch control horn extending forwardly from each blade adjacent the hub, a swash plate for each of said rotors, each swash plate comprising an annular pitch control member and means for mounting said pitch control member coaxially with the rotor shaft so as to be universally tiltable and rotatable with the respective rotor shaft, and a pitch control link for each blade, each of said links being connected at one end to the pitch control horn of the respective blade and at the opposite end to said pitch control member at a point approximately ninety degrees in advance of the respective rotor blade and lying approximately in a vertical plane defined by the longitudinal axis of the next preceding rotor blade and the axis of the rotor shaft so that said point of connection for a blade of the lower rotor and a corresponding point of connection for a blade of the upper rotor when directly above said lower rotor blade are approximately 180 degrees apart, whereby the paths of rotation of the upper rotor blades and the lower rotor blades are maintained approximately parallel, the point of connection of said horn and link being disposed materially not more than eighty degrees ahead of the respective rotor blade to provide a stabilizing effect on the rotors.

3. In a rotor system for rotary wing aircraft, coaxial upper and lower rotors, tubular upper and lower rotor shafts extending downwardly from said rotors, a transmission at the lower ends of said shafts for driving the shafts in opposite directions, the upper rotor shaft extending up through and projecting upwardly above the lower rotor shaft, each of said rotors comprising a rotor hub mounted on the respective rotor shaft to rotate therewith and tilt universally relative thereto and at least three rotor blades extending radially outwardly from said hub, each of said blades being rotatably mounted on the hub to turn about an axis that extends longitudinally of the blade and is fixed angularly relative to said hub so that the rotor comprising the hub and four blades is tiltable as a unit about virtual axes perpendicular to the axis of the rotor shafts, a pitch control horn extending forwardly from each blade adjacent the hub, a swash plate for each of said rotors, each swash plate comprising an annular pitch control member and means for mounting said pitch control member coaxially with the rotor shafts so as to be universally tiltable and rotatable with the respective rotor shaft, a pitch control link for each blade, each of said links being connected at one end to the pitch horn of the respective blade and at the opposite end to said pitch control member at a point approximately ninety degrees in advance of the respective rotor blade and lying approximately in a plane defined by the rotor shaft axis and a virtual axis of tilt of said hub perpendicular to the rotor shaft axis and to the longitudinal axis of said blade so that said point of connection for a blade of the lower rotor and a corresponding point of connection for a blade of the upper rotor when directly above said lower rotor blade are approximately 180 degrees apart, whereby the paths of rotation of the upper rotor blades and the lower rotor blades are maintained approximately parallel, the point of connection between said horn and link being disposed not more than eighty degrees ahead of the respective rotor blade to provide a stabilizing effect on the rotor, a master pitch control member at the lower ends of the rotor shafts and means extending up inside said rotor shafts and operatively connecting said master control member with said swash plates.

4. Rotor system according to claim 3 in which said master control member is universally tiltable and in which said connecting means comprises at least three spaced parallel links extending up from said master control member and inside the upper rotor shaft, crosshead means connected with upper end portions of said links and having arms extending radially outwardly through slots in said upper rotor shaft between the rotors and linkage external of the rotor shafts connecting said cross head means with the swash plates for the upper and lower rotors to control the tilting of said swash plates by the tilting of said master control member.

5. In a rotor system for rotary wing aircraft, coaxial upper and lower rotors each having at least three variable pitch rotor blades, tubular upper and lower rotor shafts extending downwardly from said rotors, means for driving said shafts in opposite directions, the upper rotor shaft extending up through and projecting upwardly beyond the lower rotor shaft, a swash plate for each of said rotors comprising an annular pitch control member and means for mounting said pitch control member coaxially with the rotor shafts so as to be universally tiltable and rotatable with the respective rotor shaft, means operatively connecting each of said pitch control members with the blades of the respective rotor to vary the pitch of said blades by tilting said swash plates, a universally tiltable master pitch control member below the lower ends of said shafts and means extending up inside said upper rotor shaft and out through slots in the upper rotor shaft between said rotors to connect said master control member with said swash plates and thereby control the tilting of said swash plates by said master control member, said connecting means comprising at least three spaced parallel links extending up inside said upper rotor shaft, means pivotally connecting the lower ends of said links with said universally tiltable master control member, means guiding said links for individual longitudinal movement axially of said upper rotor shaft, cross head means connected with the upper ends of said links and having at least three arms extending out through said slots in the upper rotor shaft and linkage connecting said arms respectively with said swash plates to tilt said swash plates in unison with the tilting of said master control member.

6. Rotor system according to claim 5, in which said master control member, cross head means and swash plates are movable axially in unison to vary the collective pitch of said rotors.

7. Rotor system according to claim 5, in which said cross head means comprises a plurality of individual cross heads, one for each of said links, each of said cross heads being individually movable axially of said rotor shafts and connected to the respective link so as to be moved axially by movement of said master pitch control member.

References Cited in the file of this patent

UNITED STATES PATENTS

| | | |
|---|---|---|
| 2,256,635 | Young | Sept. 23, 1941 |
| 2,378,381 | Brown | June 19, 1945 |
| 2,627,929 | Sikorsky | Feb. 10, 1953 |
| 2,670,051 | Hohenemser | Feb. 23, 1954 |
| 2,731,215 | Avery | Jan. 17, 1956 |